UNITED STATES PATENT OFFICE.

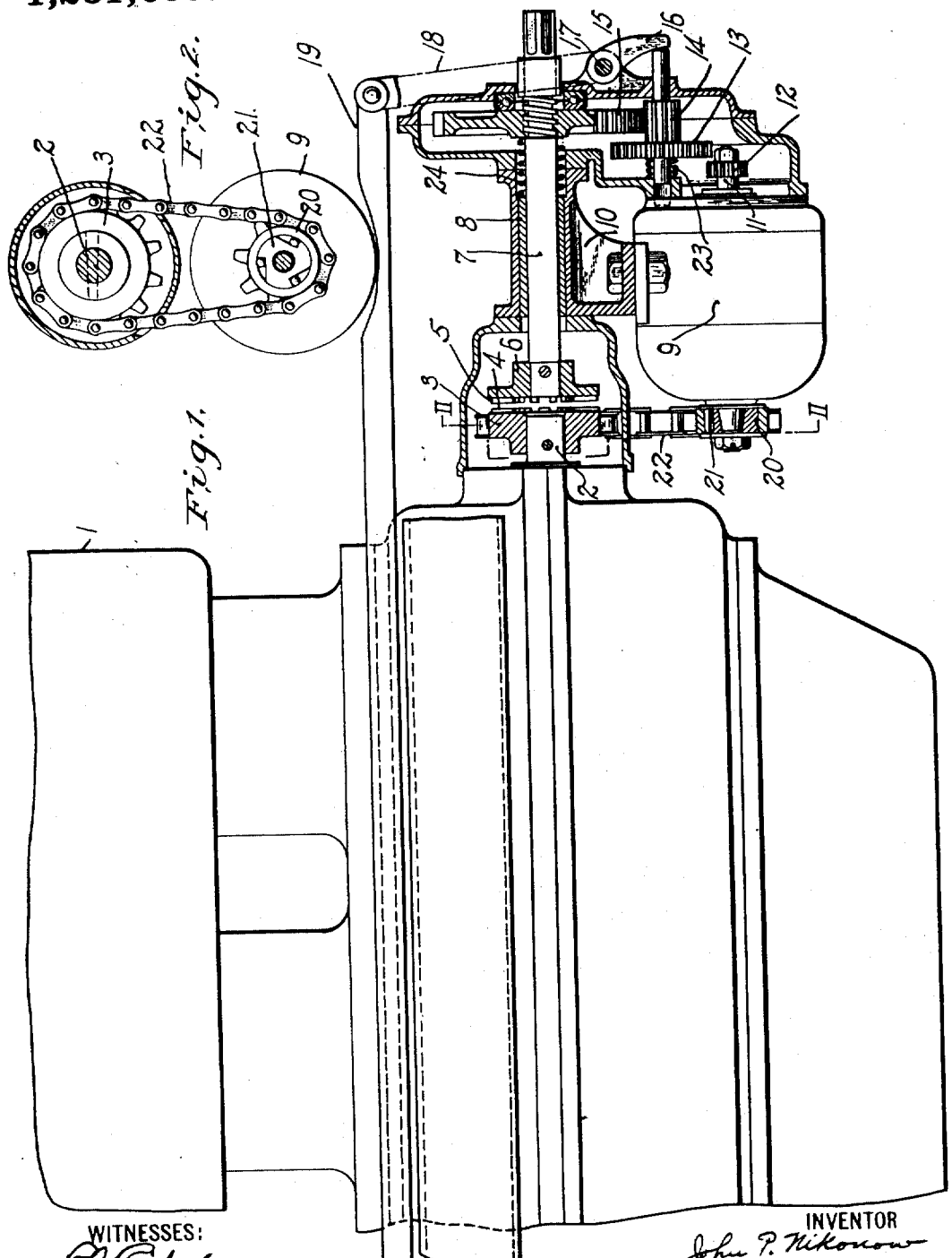

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING MECHANISM FOR AUTOMOBILES.

1,231,639.

Specification of Letters Patent.

Patented July 3, 1917.

Application filed March 3, 1914. Serial No. 822,171.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting Mechanism for Automobiles, of which the following is a specification.

My invention relates to starting mechanisms for automobiles and it has particular reference to such mechanisms as embody dynamo-electric machines which operate as motors to start the gas engines of automobiles or other motor vehicles and as generators when the engines have started under their own power.

My invention has for its object to provide a simple and convenient means for operatively connecting a dynamo-electric machine to the shaft of a gas engine at different speed ratios for operation as a motor and as a generator, respectively.

In the operation of dynamo-electric machines which successively perform the functions of motors and of generators in connection with the gas engines of automobiles, it is essential that different speed ratios be employed for the separate operations. Such an arrangement permits the employment of a small machine which operates as a motor at a high speed ratio relatively to the engine shaft, in order to develop sufficient torque to start the engine, and which operates as a generator at approximately engine speed.

In the accompanying drawing, Figure 1 is a side view, partially in elevation and partially in section, of a portion of a gas engine with my invention applied thereto. Fig. 2 is a sectional view taken on line II—II of Fig. 1.

A gas engine 1, only a portion of which is shown, comprises a shaft 2 that is provided, at its forward end, with a sprocket wheel 3. The sprocket wheel 3 is provided, upon its forward face, with clutch teeth 4 which coact with similar teeth 5 of a clutch member 6. The clutch member 6 is carried by a shaft 7 which is in alinement with the engine shaft 2 and is slidably mounted for longitudinal movement. The shaft 7 has a bearing in a sleeve member 8 which may be attached to the automobile chassis in any suitable manner (not shown). A dynamo-electric machine 9, which is attached to a bracket 10, that is secured to the sleeve member 8, comprises a shaft 11 that is provided, at its forward end, with a pinion 12. A gear wheel 13 is mounted to slide into and out of mesh with the pinion 12. A pinion 14, which may be connected to or integral with the gear wheel 13, is of such a length that its teeth are constantly in mesh with a gear wheel 15 that is loosely mounted upon the shaft 7 and has a screw-threaded engagement therewith. The positions of the gear wheel 13 and of the pinion 14 are controlled by a crank arm 16 that is fixed upon a rock shaft 17. A second crank arm 18, which is fixed to the shaft 17, is connected by a link 19 to a suitable pedal or lever (not shown) that is located within convenient reach of the operator.

The shaft 11 of the dynamo-electric machine 9 is provided, at its rear end, with a sprocket wheel 20 which is connected to the shaft 11 by means of a one-way clutch 21 of the usual roller type. The sprocket wheel 20 is connected to the sprocket wheel 3 on the engine shaft 2 by means of a suitable chain 22. A spring 23 normally retains the gear wheel 13 out of engagement with the pinion 12. A similar spring 24 normally retains the gear wheel 15 and the shaft in their respective illustrated positions with the clutch members 4 and 5 out of engagement. The spring 24 serves, also, to retain the gear wheel 15 in its illustrated position when the clutch members are being disengaged, as will be later described.

It may be assumed that the various parts occupy their respective positions, as illustrated, and that it is desired to start the engine. The rock shaft 17 will be actuated by the connected mechanism above described to slide the gear wheel 13 into mesh with the pinion 12. The circuit of the dynamo-electric machine 9 will then be completed by any suitable electrical connection (not shown). The gear wheel 15 is then rotated in a clockwise direction, as viewed from the forward end, and the shaft 7 is shifted rearwardly because of its screw threaded connection with the gear wheel 15, to effect the engagement of the clutch teeth 4 and 5. The dynamo-electric machine 9 will then operate as a motor through the reduction gear mechanism to start the engine. During the starting operation, the one-way clutch 21 permits the armature shaft 11 to over-run the sprocket wheel 20 which is operatively connected to the engine shaft.

When the engine starts under its own power, the shaft 7 will be driven at a speed which exceeds that of the gear wheel 15, and, as a result, the shaft 7 will be moved outwardly because of its threaded engagement with the gear wheel 15 and the clutch teeth 4 and 5 are disengaged thereby. The engine shaft 2 will then drive the dynamo-electric machine at a different speed ratio through the sprocket wheel 3, chain 22, sprocket wheel 20, and one-way clutch 21. The operator will then release the pedal or lever, as the case may be, and allow a spring 23, which has been compressed, to shift the gear wheel 13 out of engagement with the pinion 12. The dynamo-electric machine 9 then operates as a generator and its current may be utilized in any suitable and well known manner for charging a storage battery and for supplying lighting and ignition systems.

The engine shaft 2 may be rotated manually, if desired, the shaft 7 being provided, at its forward end, with means for engagement by the usual hand crank (not shown). It is only necessary that the shaft 7 be shifted rearwardly against the tension of a spring 24 to effect the engagement of the clutch teeth 4 and 5, whereupon the engine may be started in the usual manner. It will be noted that I provide a simple and convenient means for automatically connecting a dynamo-electric machine to an engine shaft for operation at different speed ratios. While the connecting mechanism is under the control of the operator, no harm can result by any delay in releasing the same after the engine has started.

I claim as my invention:

1. The combination with an engine shaft and a dynamo-electric machine, of a shaft slidable into and out of engagement with said engine shaft, and means whereby the initial rotation of said dynamo-electric machine effects the operative connection of said slidable shaft to said engine shaft.

2. The combination with an engine shaft and a dynamo-electric machine, of a shaft slidable into and out of engagement with said engine shaft, and means whereby the initial rotation of said dynamo-electric machine effects the operative connection of said slidable shaft to said engine shaft and the subsequent rotation of said dynamo-electric machine effects the rotation of said engine shaft.

3. The combination with an engine shaft and a dynamo-electric machine, of means for operatively connecting said dynamo-electric machine to said shaft, said means comprising a slidable shaft and a gear wheel having a screw-threaded engagement with said slidable shaft.

4. The combination with an engine shaft and a dynamo-electric machine, of a slidable shaft adapted to engage said engine shaft, a gear wheel having a screw-threaded engagement with said slidable shaft and an operative connection to said dynamo-electric machine.

5. The combination with an engine shaft, and a dynamo-electric machine, of means for operatively connecting said dynamo-electric machine to said shaft, said means comprising a slidable shaft in alinement with said engine shaft and a reduction gear mechanism, one member of which has a screw-threaded engagement with said slidable shaft.

6. The combination with an engine shaft and a dynamo-electric machine, of a shaft slidable into and out of engagement with said engine shaft, a reduction gear mechanism for operatively connecting said dynamo-electric machine to said slidable shaft, and gear mechanism for directly connecting said dynamo-electric machine to said engine shaft.

7. The combination with an engine shaft and a dynamo-electric machine, of means for operatively connecting said dynamo-electric machine to said engine shaft at one speed ratio when the engine shaft is the driven member, said means comprising a slidable shaft in alinement with the engine shaft and reduction gear mechanism comprising a slidable member and means for operatively connecting said dynamo-electric machine to said engine shaft at a second speed ratio when the engine shaft is the driving member.

8. The combination with an engine shaft, a dynamo-electric machine, and a shaft slidable into and out of engagement with the engine shaft, of means for operatively connecting the dynamo-electric machine to said slidable shaft and for effecting longitudinal movement of the latter, said means comprising a gear wheel having a screw-threaded engagement with said shaft and means for limiting the longitudinal movement of said gear wheel.

In testimony whereof, I have hereunto subscribed my name this 27th day of Feb. 1914.

JOHN P. NIKONOW.

Witnesses:
HARRY T. GEORGE,
B. B. HINES.